Figure 1:
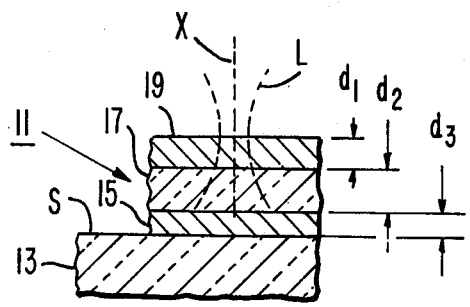

United States Patent [19]

Bell

[11] 4,216,501
[45] Aug. 5, 1980

[54] OPTICAL ANTI-REFLECTIVE INFORMATION RECORD

[75] Inventor: Alan E. Bell, East Windsor, N.J.

[73] Assignee: RCA Corporation, New York, N.Y.

[21] Appl. No.: 968,415

[22] Filed: Dec. 11, 1978

Related U.S. Application Data

[62] Division of Ser. No. 782,032, Mar. 28, 1977.

[51] Int. Cl.$^2$ .......................... H04N 5/76; G11B 7/24; G01D 15/34
[52] U.S. Cl. .......................... 358/128.5; 179/100.3 V; 274/42 R; 346/76 L; 346/135.1
[58] Field of Search ..................... 346/76 L, 108, 135; 274/41 R, 41 A, 41.6 R, 42 R; 179/100.3 V, 100.4 C; 358/127-129, 297; 427/164-167, 250; 428/432, 913

[56] References Cited

U.S. PATENT DOCUMENTS

| | | | |
|---|---|---|---|
| 3,560,994 | 2/1971 | Wolff et al. | 346/135 |
| 3,665,483 | 5/1972 | Becker | 346/1 |
| 3,739,088 | 6/1973 | Landsman | 358/129 |
| 3,747,117 | 7/1973 | Fechter | 346/1 |
| 4,023,185 | 5/1977 | Bloom et al. | 346/135 |
| 4,069,487 | 1/1978 | Kasai | 346/76 L |
| 4,097,895 | 6/1978 | Spong | 358/128 |

OTHER PUBLICATIONS

Greenblott, High Density Information Recording by Vaporization of Film Areas, IBM Tech. Disc. Bulletins, vol. 14, No. 8, 1/72, p. 2358.

Primary Examiner—Raymond F. Cardillo, Jr.
Attorney, Agent, or Firm—E. M. Whitacre; J. S. Tripoli; J. E. Roehling

[57] ABSTRACT

A flat major surface of a disc-shaped substrate (e.g., of glass) is coated with a light-reflective layer (e.g., of aluminum) which is coated with a dielectric material (e.g., silicon dioxide) highly transparent for light of a frequency supplied by a recording laser, which dielectric material is coated with a thin layer of a material absorptive for light of the frequency supplied by the recording laser (e.g., titanium). The coating parameters are chosen to establish an anti-reflection condition for the coated record blank at the recording light frequency. The light output of the laser, which is intensity modulated in accordance with a signal to be recorded, is focused upon the coated surface of the disc as the disc is rotated. With the peak intensity of the focused light sufficient to at least cause melting of the absorptive layer, an information track is formed as a succession of spaced pits in which the reflective layer is effectively exposed through the layer of dielectric material. For playback, light of a constant intensity is focused on the information track as the disc is rotated. The focused light is of insufficient intensity to effect melting of the remaining absorptive layer, but is of a frequency at which the undisturbed regions of the coated disc exhibit an anti-reflection condition. A photodetector, positioned to receive light reflected from the information track as the pits pass through the path of the focused light, develops a signal representative of the recorded information.

12 Claims, 3 Drawing Figures

U.S. Patent  Aug. 5, 1980  4,216,501

OPTICAL ANTI-REFLECTIVE INFORMATION RECORD

The Government has rights in this invention pursuant to Contract No. MDA 904-76-C-0429 awarded by the Department of the ARMY.

This is a division of application Ser. No. 782,032, filed Mar. 28, 1977.

The present invention relates generally to a novel high-density information storage medium. More particularly, this invention relates to an information storage medium suitable for use with optical recording and playback methods and apparatus.

In accordance with the principles of the present invention, the efficient coupling of energy from the recording light beam into an absorptive material coating (necessary for the achievement of an adequate recording sensitivity) is achieved by construction of the recording medium in the form of a substrate having a surface which is highly reflective (at least at the frequency of the light forming the recording beam), with a layer of material transparent at the recording beam light frequency overlying the reflective surface, and a thin layer of material, highly absorptive at the recording beam light frequency, overlying the transparent layer. With both incident light and reflected light (reflected from the substrate surface through the transparent layer) passing through the thin absorptive layer, the ability to rapidly elevate the temperature of the absorptive layer material to that required for melting to take place is enhanced.

Pursuant to one aspect of the present invention, the absorptive layer is chosen from a material having high absorptivity and exhibiting long-term stability, such as titanium, platinum and rhodium. Furthermore, the long-term stability of the entire record blank is enhanced since the reflective surface, being subject to oxidation, is protected from environmental exposure by the light transparent layer.

Pursuant to a further aspect of the present invention, the efficiency of energy coupling into the absorptive layer is enhanced by choosing a thickness for the transparent layer which establishes a so-called anti-reflection condition for the coated substrate at the recording beam light frequency. With energy loss via reflection minimized due to the anti-reflection condition establishment, and with energy loss via transmission into the substrate minimized by the reflective surface presence, a highly efficient heating of the absorptive layer to a melting temperature is realizable.

In accordance with another aspect of the present invention, the thickness of the absorptive layer is reduced to a minimum so as to significantly decrease the laser power needed for recording thereon. The chosen thickness, however, must still be sufficient to allow the absorption of a maximum fraction of the light incident thereon. When utilizing a metallic absorptive layer, the melting process, resulting from the efficient energy coupling in the absorptive layer which is necessary for information recording, is effective in forming in the thin absorptive layer pits having smooth edges, leading to high definition between the melted pit regions and the undisturbed regions and thus contributing to a high signal-to-noise ratio on read-out.

Pursuant to a further aspect of the present invention, the use of an absorptive layer having a high melting point, such as a metal, enables information read-out at relatively high intensity levels, thus reducing the adverse effect of "shot noise" during information read-out.

In accordance with an illustrative embodiment of the present invention, a surface of a substrate of a disc form (e.g., glass) is processed so as to form a polished flat surface, which is then coated with a layer of a reflective material (e.g., of aluminum). A layer of material (e.g., a dielectric material, such as a silicon dioxide) which is transparent at the light frequency of a monochromatic light source available for recording use (e.g., an argon laser, providing an output at a wavelength of 4880 angstrom units) is deposited over the reflective layer. Finally, the dielectric layer is coated with a thin layer of material (e.g., an organic dye or a metal) which is absorptive at the light frequency of the recording light source.

In an illustrative recording sysstem (e.g., of the type described in copending U.S. Application Ser. No. 668,495, to F. W. Spong now U.S. Pat. No. 4,097,895.) a record blank of the above-described disc form embodying the principles of the present invention is subjected to rotation at a constant rotational speed while a beam of light from a light source (e.g., a laser, providing light at a frequency at which the anti-reflection condition is obtained) is focused on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect melting of the absorptive material and a low level insufficient to effect such melting, the frequency of the level alternations varying as the video signal amplitude changes.

An information track comprising a succession of spaced pits is thus formed in the coated surface of the disc. The pits appearing in those surface regions exposed to the high level beam, due to melting of the absorptive layer material in responsive to the high level beam exposure with variations in the length and separation of the pits being representative of the recorded information. Where a continuous sequence of pictures is to be recorded, a spiral information track may be formed by providing relative motion, in a radial direction and at a constant rate during the recording between the recording beam and the rotating disc. Alternatively, in the absence of such relative motion during the recording, a circular information track may be formed, appropriate for "slide" recording purposes.

The result of the above-described recording process is the formation of an information record of a form which facilitates recovery of the recorded information by optical playback processes. The information track of such an information record comprises (1) undisturbed surface regions that exhibit very low reflectance at an appropriate light frequency (due to the anti-reflection thickness choice described previously), alternating with (2) pit regions, formed by the melting process, that exhibit appreciably higher reflectance at the same light frequency (due to complete, or at least partial, removal of the absorptive layer covering of the transparent layer and the reflective surface of the substrate, ensuring departure from the anti-reflection condition). A high ratio between the reflectance of the pit regions and the reflectance of the intervening (undisturbed surface) regions is readily provided.

In playback operations, a light beam is focused upon the information track of a rotating information record of the above-described type embodying the principles of the present invention. The playback beam has a constant intensity at a level insufficient to effect melting of the disc coatings, and is of a frequency substantially corresponding to that at which the undisturbed surface regions exhibit an anti-reflection condition. A photodetector, positioned to receive light reflected from the successive regions of the information track as they pass through the path of the focused light, develops a signal representative of the recorded information. A high readout contrast ratio (due to the large differences in reflectance of the pit regions and the intervening track regions, at the light frequency of the playback beam) is readily obtained, permitting recovery of the recorded video signals with an excellent signal-to-noise-ratio.

Figure 2:
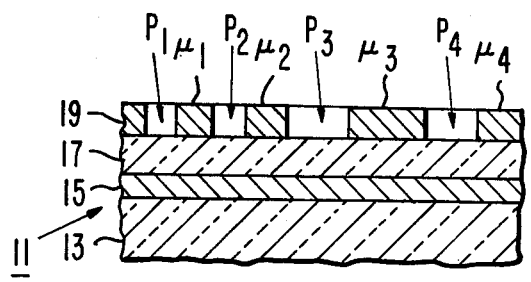
Figure 3:
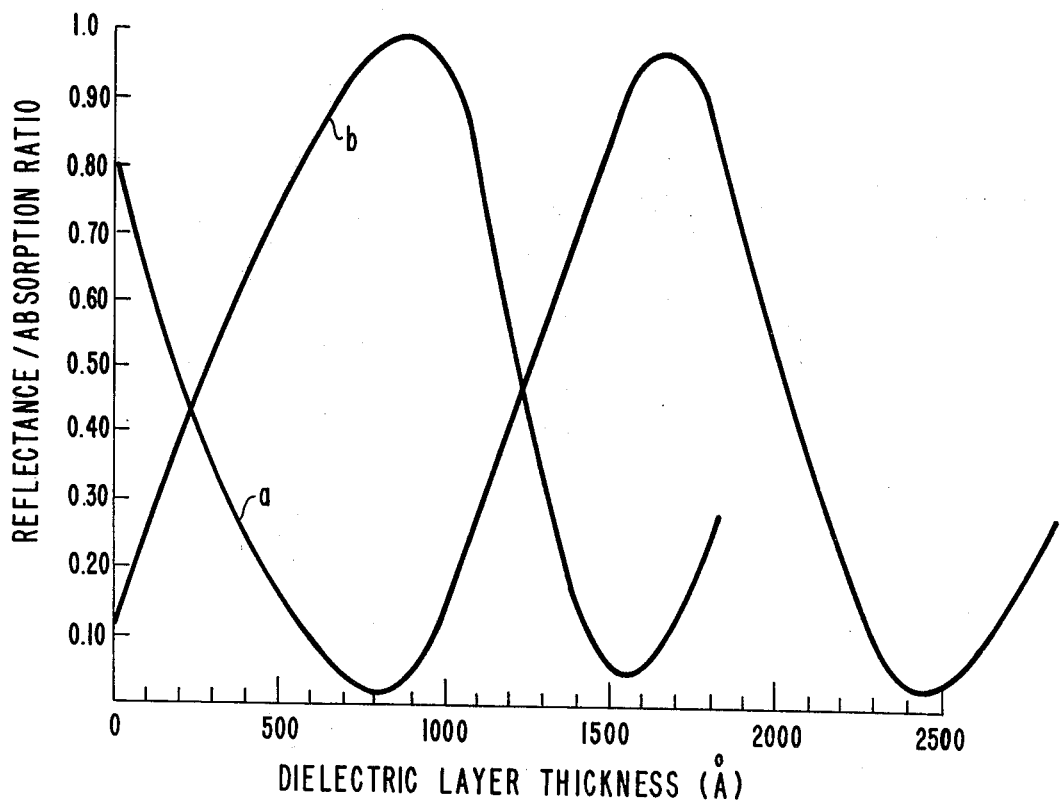

In the accompanying drawings:

FIG. 1 provides a cross-sectional view of a portion of a recording medium, exhibiting a construction in accordance with principles of the present invention;

FIG. 2 illustrates a cross-sectional view of a portion of the information track of an information record formed from a recording medium of the type shown in FIG. 1 pursuant to principles of the present invention; and FIG. 3 provides a graph of the relationship between dielectric layer thickness and reflectance for an illustrative form of the recording medium of FIGS. 1 and 2.

In FIG. 1, a cross-sectional view of a portion of a record blank 11, formed for use in an optical recording system, shows the construction of a recording medium pursuant to an illustrative embodiment of the present invention. The record blank 11 includes a substrate 13, which is illustratively formed in the shape of a disc, a major surface (s) of which is processed to be polished and flat. Desirably, the substrate 13 is formed of a material, such as glass, for example, which may be conveniently processed to achieve such surface.

Overlying the surface "s" of the substrate 13 is a thin layer 15 of a material exhibiting a high reflectivity (over at least a given portion of the light spectrum). Illustratively, the reflecting layer 15 is formed of a metal, such as aluminum, for example, deposited on the surface "s" by an evaporation process.

Overlying the reflecting layer 15 is a layer 17 of material which is light transparent (at least over the aforementioned given portion of the light spectrum). Illustratively, the transparent 17 is formed of a dielectric material, such as silicon dioxide, for example, deposited on the reflecting layer 15 by an evaporation process.

Finally, overlying the transparent layer 17 is a thin layer 19 of material which is light absorptive at least over the aforementioned given portion of the light spectrum. Illustratively, the absorptive layer is formed of a 50 Å layer of a metal, such as titanium or rhodium, deposited on the transparent layer 17 by an evaporation process.

It will be noted that when depositing titanium in the record blank manufacturing process, a 75 Å thick layer of titanium is deposited over the dielectric coating. Upon exposure of the record blank to the atmosphere, the portion of the titanium layer exposed to the atmosphere oxidizes forming an approximately 25 Å thick layer of titanium dioxide, thus effectively leaving a 50 Å thick layer of titanium over the dielectric layer. Titanium dioxide is transparent, at the light frequency of the recording and playback beams, and its effect is inappreciable on the recording and playback processes.

An advantage of the use, in the illustrated construction of the recording medium, of a thin absorptive layer overlying a transparent layer which in turn overlies a reflective surface will be recognized by consideration of the effect achieved when a light beam L (of a frequency in the aforementioned given portion of the spectrum) is directed along an axis (x) normal to the surface "s", and focused at or near the surface of the absorptive layer 19. Most of that portion of the incident light which reaches the interior boundary of the absorptive layer 19 is not "lost" through transmission into the substrate 13, as would occur in the absence of the reflecting layer 15, but rather is reflected back through the transparent layer 17 into the absorptive layer 19. The consequence is exposure of the absorptive layer 19 to both incident and reflected light. Where it is desired to effect surface melting in response to recording light exposure, this avoidance of transmission losses into the interior of the recording medium increases the coupling efficiency of energy from the recording light beam into the absorptive material enhancing recording sensitivity. While a similar avoidance of transmission losses into the interior of the recording medium would be achieved by forming a thicker absorptive layer (i.e., increasing the reflectance thereof), the transmission loss avoidance would be offset by high reflection losses.

For optimum efficiency of coupling of energy from the recording light beam L into the absorptive layer 19, reflection losses are desirably reduced to a low level by choosing the thickness ($d_1$) of the absorptive layer 19, with relation to the thickness ($d_2$) of the transparent layer 17, the thickness ($d_3$) of the reflecting layer 15 and the optical constants of the elements of the system 19-17-15-13, to establish a so-called anti-reflection condition for the system at the recording beam frequency. The achievement of an anti-reflection effect by use of thin films of appropriate thickness and optical properties is well known, per se, and applications of the effect with films of transmissive materials are widespread in optical equipment. Formulae which may be used in arriving at parameter combinations for the absorptive media (19, 17, 15) of the FIG. 1 system that result in the desired anti-reflection condition are well known in the art and a presentation thereof may be found in the above mentioned Spong application.

When the intensity of the focused light beam L is of sufficient magnitude, material of the absorptive layer 19 is elevated to a melting temperature, and melting of the material occurs, forming a pit in the surface of the record blank 11. With suitable modulation of the intensity of the beam L in accordance with a recording signal, as successive regions of the record blank 11 pass through the beam path, an information track may be formed comprising spaced pits in regions of the absorptive layer subject to the high intensity beam exposure, separated by undisturbed regions of the absorptive layer (that were not subject to such high intensity beam exposure).

FIG. 2 illustrates a portion of an information record formed when the record blank 11 of FIG. 1 is subjected to such controlled beam exposure. As shown in cross-section in FIG. 2, the information track comprises a succession of spaced pits $p_1$, $p_2$, $p_3$, $p_4$, separated by regions ($u_1$, $u_2$, $u_3$, $u_4$) in which the surface of the absorptive layer 19 is undisturbed. For illustrative purposes, the depth of each pit is shown as being equal to the thickness of the absorptive layer 19, whereby the reflective layer 15 is wholly uncovered through the transparent layer 17 in the pit regions. As will be discussed subsequently, while such a depth of melting may desirably result in maximization of the readout contrast ratio, it is not essential for good playback results. Thus, in an acceptable alternative to the illustrated form of information record, a residual portion of the absorptive material (with a thickness, of course, less than $d_1$) may overlie the transparent layer 17 in the pit bottoms.

When the light frequency of a playback beam provided by a laser falls in the given spectrum portion for which the disc's layer 19 is highly absorptive and for which the disc's layer 15 is highly reflective, and at or close to the frequency at which the undisturbed regions of the system 19-17-15-13 exhibit the anti-reflection effect, a high readout contrast ratio is realized, permitting video signal recovery with an excellent signal-to-noise ratio. Illustratively, with use of a deviation range of 7-10 Mhz, color television signals of an NTSC format have been recovered with a video signal-to-noise ratio of 45-50 (peak-to-peak video to rms noise) for a video bandwidth of 5 MHz.

Curve "a" of the graph of FIG. 3 shows that the computed minimum reflectance (D min.) for the illustrative system parameter choices for the system of FIG. 1 occurs at a dielectric layer thickness given by the following equation:

$$D\text{min} = 790 \text{ Å} + n1670 \text{ Å}$$

where n is zero or a positive integer. Thus, when a choice for the Dmin thickness of the dielectric layer (e.g., 790 Å value) is associated with the illustrative system parameter choices, the record blank of FIG. 1 (and the non-depressed regions of the information record of FIG. 2) exhibits an anti-reflection condition for the argon laser output.

It will be appreciated that where the flat substrate is formed of a temperature sensitive material (e.g., polyvinyl chloride), care must be taken to avoid disturbance of the substrate by the heat generated in the recording process. Under those circumstances, the substrate can be effectively insulated from the heat generated by the recording laser by choosing a choice for the Dmin thickness for the dielectric layer which Dmin choice is greater than the thermal diffusion length (1) through the dielectric layer (e.g., a Dmin choice where $n>2$).

Curve "b" shows absorption in a 50 Å thick titanium layer, for the illustrative system parameter choices for the system of FIG. 1, when computed as a function of dielectric layer thickness.

While the principles of the present invention have been demonstrated with particular regard to the illustrative structures of FIGS. 1 and 2, it will be recognized that various departures from such illustrative structures may be undertaken in practice of the invention. For example, the substrate itself may be formed of material having high reflectivity, eliminating the need for employing a separate reflecting layer in forming a reflective surface underlying the transparent layer. Furthermore, while the invention was particularly described by examples where the absorptive layer was formed of a metallic material, other materials, such as organic dyes (e.g., of a type employed in the aforementioned Spong application) may be used. The anti-reflection condition for the disc medium obtained by Spong, is also obtained, through application of the principles of the present invention, with a significant diminution in the thickness of the organic dye due to the above mentioned dielectric layer thickness. For another example, since wideband reflection is not required of the reflecting layer, the metal coating may be supplanted by a multilayer (or even a single layer) dielectric reflector. It should also be appreciated that other forms of optical recording (such as pulsed holographic recording) may use the advantageous record blank structure described herein.

What is claimed is:

1. An information record, for use in playback apparatus employing a playback beam of light of a given frequency; said record comprising:
    a substrate having a light reflecting surface at said given frequency;
    a first coating overlying said light reflecting surface, said coating being substantially transparent at said given frequency for permitting at least a portion of said light beam to pass through said first coating to said light reflecting surface; and
    a second coating of a metallic material which is highly absorptive to light of said given frequency overlying said first coating, said second coating having an information track formed therein;
    the thickness of said second coating being such that said second coating is partially transmissive to light of said given frequency;
    the thickness of said first coating being greater than the thickness of said second coating;
    wherein said information track comprises a succession of spaced pits, with variations in the spacing between successive pit edges representative of recorded information;
    wherein the thickness of said second coating in all regions other than those occupied by said pits is so related to the thickness of said first coating and the optical constants of said substrate and the respective materials of said first coating and said second coating so as to establish a substantially anti-reflective condition for all of said nonpit regions at said given frequency with respect to the light beam incident on said second coating; and
    wherein the thickness of said second coating in those regions occupied by said pits is less than the thickness required to establish an anti-reflective condition in said pit regions.

2. An information record in accordance with claim 1 wherein said pits comprise regions substantially free of said second coating material.

3. An information record in accordance with claim 1 wherein said substrate is in the form of a disc and wherein said light reflective surface comprises a metal layer deposited on a major surface of said disc.

4. An information record in accordance with claim 3 wherein said metallic material is titanium.

5. An information record in accordance with claim 4 further comprising a coating of titanium dioxide overlying said titanium.

6. An information record for use in playback apparatus employing a light beam of a given frequency; said information record comprising the combination of:
    a substrate having a light reflecting surface at said given frequency;
    a first coating overlying said light reflecting surface, said coating being substantially transparent at said given frequency for permitting at least a portion of said light beam to pass through said first coating to said light reflecting surface the thickness of said first coating being greater than 50 angstroms; and a second coating overlying said first coating, said second coating comprising a material which is light absorptive at said given frequency; said second coating having an information track formed therein; the thickness of said second coating being such that said second coating is partially transmissive to light of said given frequency;

wherein said information track comprises a succession of spaced pits with variations in the spacing between successive pit edges representative of recorded information;

wherein the thickness of said second coating in all regions other than those occupied by said pits is so related to the thickness of said first coating and the optical constants of said substrate and the respective materials of said first coating and said second coating so as to establish a substantially anti-reflective condition for all of said non-pit regions at said given frequency with respect to the light beam incident on said second coating; said anti-reflective condition being such that less than 30 percent of the light incident on said second coating is reflected by said information record.

7. An information record in accordance with claim 6 wherein said light absorptive coating comprises a metal.

8. An information record in accordance with claim 7 wherein said substrate is in the form of a disc, and wherein said light reflecting surface is formed by a metal coating on a major surface of said disc.

9. An information record in accordance with claim 8 wherein said light reflective surface comprises aluminum.

10. An information record in accordance with claim 9 wherein said light absorptive coating comprises titanium.

11. An information record for use in playback apparatus employing a light beam of a given frequency; said information record comprising the combination of:
a substrate;
a layer of material exhibiting high reflectivity at said given frequency, said layer overlying a surface of said substrate;
a first coating exhibiting light transparency at said given frequency, said first coating overlying said layer for permitting at least a portion of said light beam to pass through said first coating to said layer the thickness of said first coating being greater than 50 angstroms; and
a second coating of a material which exhibits high absorptivity at said given frequency, said second coating which overlies said first coating having an information track formed therein; the thickness of said second coating is such that said second coating is partially transmissive to light at said given frequency;

wherein said information track comprises a succession of spaced pits, with variations in the spacing between successive pit edges representative of recorded information;

wherein the thickness of said second coating in all regions other than those occupied by said pits is so related to the thickness of said first coating and the optical constants of said substrate and the respective materials of said first coating and said second coating so as to establish a substantially anti-reflective condition for all of said non-pit regions at said given frequency with respect to the light beam incident on said second coating; said anti-reflective condition being such that less than 30 percent of the light incident on said second coating is reflected by said information record.

12. An information record in accordance with claim 11 wherein said light absorptive coating comprises a metal.

* * * * *